INVENTOR.
ROGER C. STEELE
BY
ATTORNEY

Sept. 16, 1952 R. C. STEELE 2,610,934
METHOD OF AND APPARATUS FOR MAKING HONEYCOMB MATERIAL
Filed Nov. 22, 1948 3 Sheets-Sheet 2

INVENTOR.
ROGER C. STEELE
BY
ATTORNEY

Sept. 16, 1952 R. C. STEELE 2,610,934
METHOD OF AND APPARATUS FOR MAKING HONEYCOMB MATERIAL
Filed Nov. 22, 1948 3 Sheets-Sheet 3
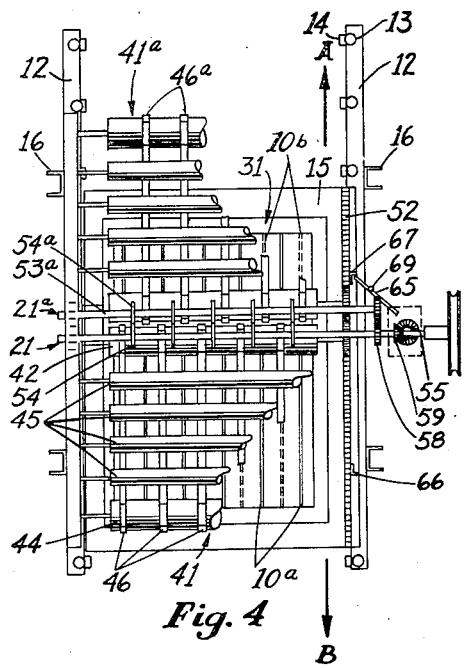
Fig. 4
Fig. 6
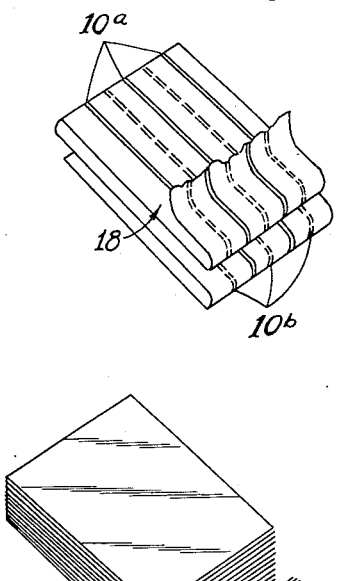
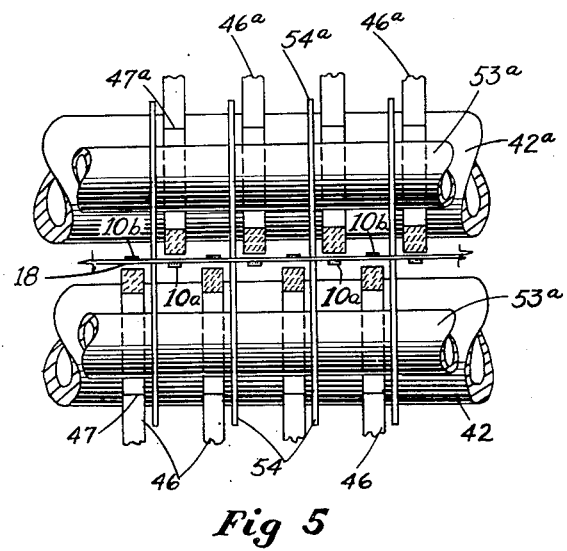
Fig 5
Fig. 7
INVENTOR.
ROGER C. STEELE
BY 
ATTORNEY Patented Sept. 16, 1952

2,610,934

UNITED STATES PATENT OFFICE 2,610,934

METHOD OF AND APPARATUS FOR MAKING HONEYCOMB MATERIAL

Roger C. Steele, Oakland, Calif., assignor to California Reinforced Plastics Company, Berkeley, Calif.

Application November 22, 1948, Serial No. 61,352

13 Claims. (Cl. 154—1.8)

1

This invention relates to an improved method and machine for making a honeycomb structure out of an elongated sheet of flexible material.

It has been found that use of a honeycomb or cellular core in laminated panel, wall bulkhead or fuselage structure makes it possible to produce such products which are not only extremely light in weight but which are characterized by their great structural strength and rigidity.

A principal object, therefore, of the present invention is to provide a method and a machine for making honeycomb out of an elongated sheet of flexible material, such as paper, aluminum foil, cloth, fabric, glass cloth, or the like in substantially one continuous operation.

The present invention comprises generally a machine having means to apply substantially parallel and uniform glue lines to an elongated sheet of material and to further provide means to lap said glued material back and forth over itself in superposed layers to form a stack of layers which may be sliced into smaller pieces and expanded to form a honeycomb structure which is characterized by its uniformity in cell size and shape.

Another object of this invention is to provide a machine which is capable of making large quantities of unexpanded honeycomb material from elongated sheets of flexible material in one substantially continuous operation and employing a minimum of hand labor.

Another object of this invention is to provide a machine for making honeycomb of the type above referred to which said machine is provided with novel means to maintain a stack of superposed loyers of glued material tightly compressed together during lapping operations to prevent undesirable wrinkles or creases being formed in said material.

A further object of this invention is to provide a machine for making honeycomb which is relatively inexpensive to manufacture, is of sturdy construction and is relatively simple to install and operate.

Other objects of this invention will become apparent upon reading the following specification and referring to the accompanying drawings, in which similar characters of reference represent corresponding parts in each of the several views.

In the drawings:

Fig. 1 is a perspective view of the machine.
Fig. 2 is a side elevational view of the machine.
Fig. 3 is an end elevational view of the machine.
Fig. 4 is a view, taken along line 4—4 of Fig. 2, showing parts partially broken away in section.
Fig. 5 is an enlarged fragmentary view of parts of the driving and compressing mechanism of the machine.

Fig. 6 is an exploded view, showing the manner in which the material is lapped over itself in the machine and the relative positions of the glue lines.

Fig. 7 illustrates the manner in which stacks of superposed layers of glued material may be sliced and expanded to form a honeycomb structure.

Figure 1:
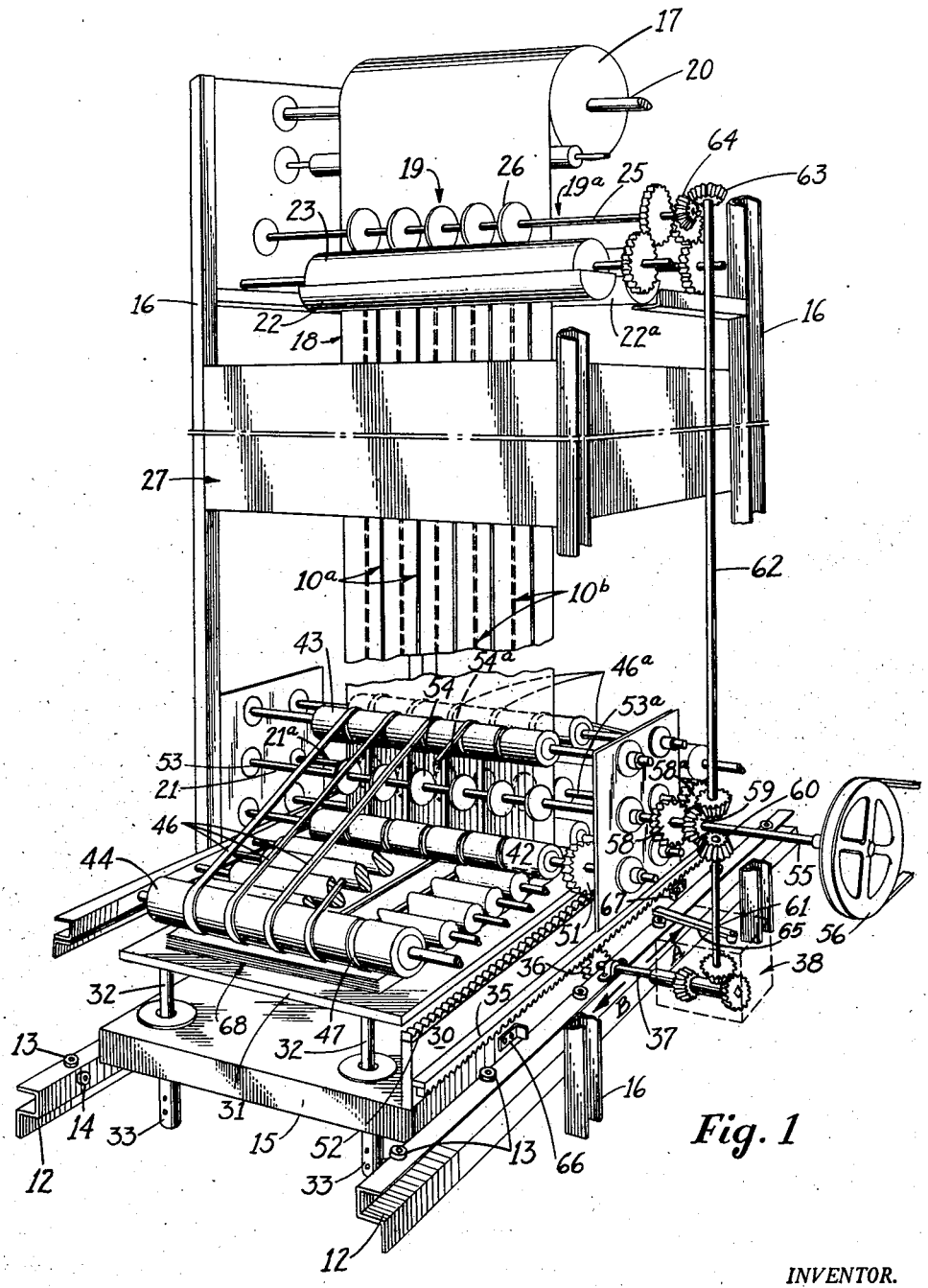
Figure 3:
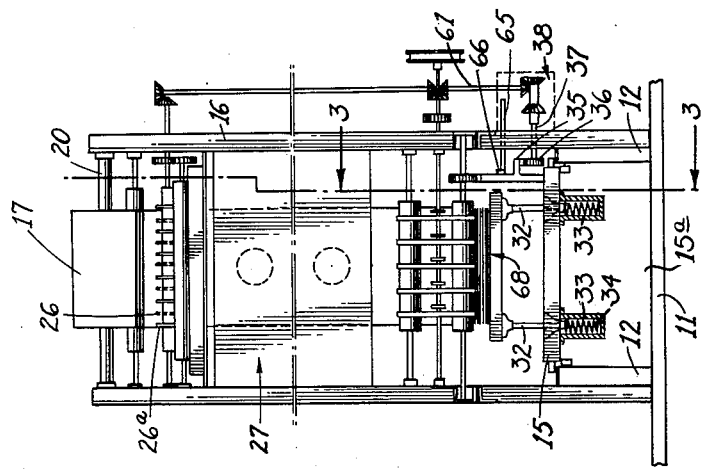

The apparatus to be described herein incorporates a large number of rotating or rotatably mounted shafts or rollers and all of which, for purposes of simplicity and clarity in illustration, are not shown as being visibly supported by suitable bearings and the like. It will suffice, for the proper understanding of this invention, to relate merely that wherever such shafts are indicated and identified it is understood that in actual construction of the machine such parts would normally be supported appropriately by suitable conventional bearings. The particular type of bearings employed constitutes no part of the present invention.

Referring now to certain principal parts of the machine which are indicated generally, the general principles of operation underlying my method and apparatus for making honeycomb material may be described as follows: Spaced, substantially parallel glue lines $10^a$ and $10^b$ are applied by glue applicators $19$ and $19^a$ to each side of an elongated sheet of material $18$, whereby the glue lines on one side of the sheet are spaced between and lie parallel to the glue lines on the opposite side of the sheet. The glued material is fed downwardly by driving rollers $21$ and $21^a$ and is lapped back and forth over itself by means of a reciprocating table $31$, to form a stack $68$ of superposed layers of the glued material. Belt drive units $41$ and $41^a$ are provided to maintain the layers formed in the stack flat and tightly compressed together during lapping operation. A stack of the aforesaid glued layers may be sliced or cut transversely to the direction of glue lines, and the material expanded to form a honeycomb structure such as indicated in Figs. 6 and 7.

The particular embodiment of my invention, as shown and described herein, comprises a flat base piece $11$, provided with rigidly attached, upwardly extending side pieces $12$ which, in turn, are each provided with a plurality of horizontally and vertically disposed roller bearings, indicated at $13$ and $14$ respectively, which cooperate to form a slidable guideway or trough for carriage $15$. Extending vertically upwardly from the sides of base $11$ are vertical stud supports $16$ which are adapted to support the various parts of the machine, but, as indicated above, the drawings do not indicate all of the necessary bearing supports into which the various rotatably mounted shafts and rollers normally would be journaled.

Numeral 17 illustrates a roll of flexible material such as paper, cloth, aluminum foil, fabric or glass cloth out of which the honeycomb is to be made, which said roll is rotatably supported by shaft 20. In actual practice I prefer to impregnate the roll of flexible material, particularly if it be cloth or glass cloth, with a suitable synthetic resin, such as phenol formaldehyde, which can be and is preferably dried and/or partially cured to a relatively dry flexible state. For example, relatively soft cloth or glass cloth which has been so impregnated and thereafter properly dried and/or partially curved acquires approximately the same degree of relative stiffness and flexibility as medium weight craft paper. Numeral 18 indicates generally that portion of the material which has been unreeled from roll 17 and which is adapted to be substantially continuously fed through the machine by feed drive rollers indicated at 21 and 21a.

Glue lines are applied to opposite sides of sheet 18 during its traverse through the machine by glue applicators, indicated generally at 19 and 19a and which more specifically comprise shallow glue troughs 22 and 22a, pick-up rollers 23 and 23a, wiper blades 24 and 24a, and applicator shafts 25 and 25a. Shaft 25 is provided with a plurality of spaced annular washers 26 which are of larger diameter than shaft 25. Shaft 25a is formed similarly to shaft 25 and is provided also with a plurality of spaced annular washers 26a, but it is seen that washers 26a are not directly aligned with washers 26 but are positioned to operate against the opposite side of the material 18 between the latter said washers in alternate spaced relationship therewith.

In operation, troughs 22 and 22a are filled to a predetermined level with a suitable liquid adhesive, whereby rotation of pick-up rollers 23 and 23a (by driving means which will be described later in more detail) pick up glue from within the trough and transfer amounts of the glue to washers 26 and 26a, respectively, which said washers in turn apply glue lines 10a and 10b to opposite sides of the material. Because washers 26 are alternately spaced with relation to washers 26a, the adhesive is applied to each side of sheet 18 in spaced substantially parallel lines and in such manner that the glue lines on one side of the material lie between the glue lines applied on the opposite side thereof. Wiper blades 24 and 24a are adapted to scrape excessive amounts of glue from the pick-up rollers in order to prevent unduly large deposits of glue from forming on the applicator washers 26 and 26a to insure even and uniform glue lines being applied to the sheet material. In addition, it is preferable to space adjustably by suitable bearing supports (not shown) applicating washers 26 and 26a away from pick-up rollers 23 and 23a approximately .005 of an inch to prevent excessive amounts of glue from forming on the sides of the washers because of exceedingly close contact with the pick-up rollers.

Preferably I provide an oven, indicated generally at 27, equipped with a plurality of infrared lamps 28 to apply heat to each side of the material to partially cure and/or dry the applied glue lines on the sheet 18 in its passage downwardly through said oven to thereby make them more viscous and less likely to run or smear. In this respect it is noted that whether or not the glue lines will be made more viscous by "curing" or "drying," or both, depends on the nature of the adhesive used. For example, upon application of heat some liquid adhesives harden by "drying"—i. e., by mere evaporation of a volatile substance therefrom; whereas others harden or become more viscous by "curing"—i. e., undergoing a chemical change; whereas still other adhesives harden by both "drying" and "curing" upon being subjected to heat.

The lower part of the machine comprises, in addition to the parts already identified, a depressible table 31 having four corner legs 32 arranged to operate slidably in cylinders 33 which, in turn, are rigidly attached to and depend from carriage 15. Suitable compression springs 34 are disposed in cylinders 33 and are arranged to support the bottom ends of legs 32 to bias normally the said legs and said table upwardly.

As has been noted above, carriage 15 is positioned slidably within the trough 15a formed by sides 12 and horizontal and vertical bearings 13 and 14. A rack 35 is attached to upwardly extending side 30 of carriage 15 and is adapted to mesh with pinion 36, which, in turn, is mounted on the end of horizontal shaft 37 leading from a conventional suitable reversing gear mechanism, indicated generally at 38.

As will be more fully explained hereinafter, rotation of shaft 37, through the pinion-rack engagement with the carriage, will cause said carriage to be moved longitudinally in the slidable trough formed by roller bearings 13 and 14. The direction of movement of the carriage is dependent, of course, upon the direction of rotation of shaft 37, which latter said rotational movement is governed by the reversing gear mechanism.

A pair of oppositely disposed triangular-shaped belt-drive units, illustrated generally at 41 and 41a, are supported by various bearings (all of which are not shown) above table 31. Belt-drive unit 41 comprises more specifically a bottom end driving roller 42, top and end-corner guide rollers 43 and 44, and a plurality of freely rotatable spaced rollers 45 mounted between rollers 42 and 44. The aforementioned rollers 42, 43 and 44 are provided with annular spaced grooves, such as indicated at 47, to serve as belt guides for belts 46, whereas rollers 45 need not be so grooved. Roller 42 is provided with a spur gear or pinion 51 which meshes with an elongated gear rack 52 provided along the top edge of side 30 of carriage 15. Thus longitudinal movement of carriage 15 and rack 52 imparts a rotary motion to pinion 51 and roller 42, which said roller in turn frictionally drives belts 46 in a corresponding direction.

Belt drive unit 41a is constructed identically with belt drive 41, as just described, and the corresponding parts thereof are numbered similarly to the parts comprising belt drive 41 but are suffixed by the letter "a" to distinguish them in the drawings.

The feed drive rollers 21 and 21a, above identified, comprise a pair of driven shafts 53 and 53a which are provided with a plurality of equidistantly spaced annular friction drive washers 54 and 54a which are adapted to engage frictionally opposite sides of sheet 18 between the applied glue lines 10a and 10b thereof. Shaft 53 is in effect a continuation of the main drive shaft 55, which, in turn, may be driven, via pulley and belt drive connection 56, by a conventional variable speed motor (not shown). Spur gear 58, which is rigidly attached to an end of shaft 53, meshes with a corresponding spur gear 58ª provided on shaft 53ª. It is, therefore, seen that rotation of shaft 53 and washers 54 causes corresponding rotation of shaft 53ª and washers 54ª in an opposite direction, but at the same driving speed.

Bevel gear 59 provided on shaft 55 meshes with bevel gear 60 and rotates lower vertical shaft 61 leading to reversing gear mechanism 38, and bevel gear 59 also meshes with and drives upper vertical shaft 62, which, in turn, through bevel gears 63 and 64, is adapted to drive pick-up rollers 23 and 23ª and glue applicator shafts 25 and 25ª. By driving both the applicating washers and the pick-up rollers, uniform and constant rotation of both is insured.

Extending outwardly from reversing gear mechanism 38 in a direction toward carriage 15 is an arm 65 (see Fig. 4) adapted to actuate said reversing gear mechanism when the arm is moved either in the direction of arrow A or B, as illustrated in Figs. 1 and 4. More specifically, when arm 65 is moved in the direction of arrow A, for example, reversing mechanism 38 is actuated to rotate shaft 37 and pinion 36 in a direction appropriate to move carriage 15 longitudinally in the direction of arrow B, whereas movement of arm 65 in the direction of arrow B causes reversing gear mechanism 38 to rotate shaft 37 in the opposite direction appropriate to move carriage 15 in the direction of arrow A. Movement of arm 65 is normally accomplished through its contact with either one of the lugs 66 or 67, which said lugs project laterally outwardly from carriage 15 adjacent opposite ends thereof. The manner of cooperation between lugs 66 and 67 and arm 65 to determine directional movement of carriage 15 will be described in more detail hereinafter.

Although the specific operation of certain parts of the machine has already been described, the overall operation of the machine is as follows:

When shaft 55 is rotated, preferably off of a variable speed motor (not shown), shafts 53 and 53ª, carrying, respectively, friction washers 54 and 54ª, cooperate to unreel sheet 18 from roll 17 and to drive said sheet downwardly towards table 31. Simultaneously with the rotation of shaft 55 upper vertical shaft 62 drives pick-up rollers 23 and 23ª, and glue applicators 19 and 19ª apply glue lines to opposite sides of the material 18 in a manner which has been described above in detail. Similarly, lower vertical shaft 61 is rotated off of shaft 55 and, depending upon the position of arm 65 of reversing gear mechanism 38, shaft 37 and related pinion 36 are rotated to impart thereby, through rack 35, appropriate longitudinal movement to carriage 15 and table 31. Assuming, for example, that arm 65 is positioned in the direction of arrow A and that carriage 15 is being driven in the direction of arrow B, as above indicated, when the carriage has moved sufficiently far in the direction of arrow B, lug 66, carried by carriage 15, will be brought into contact with projection arm 65 and upon further movement of the carriage in the direction of arrow B, said lug will move said arm in the direction of arrow B to actuate reversing gear mechanism 38. Actuation of the reversing gear mechanism in this way will cause reverse rotation of shaft 37 and pinion 36 to impart a corresponding reverse movement to carriage 15 in the direction of arrow A.

When the carriage and table have been driven in the direction of arrow A a predetermined distance, contact of lug 67 with arm 65 will cause the latter to move in the direction of arrow A and once again the direction of movement of the carriage and table will be reversed. It will thus be seen that the mechanical movements which have been described impart a reciprocating movement to carriage 15 and table 31 with respect to the feed rollers and belt drive units.

Figure 2:
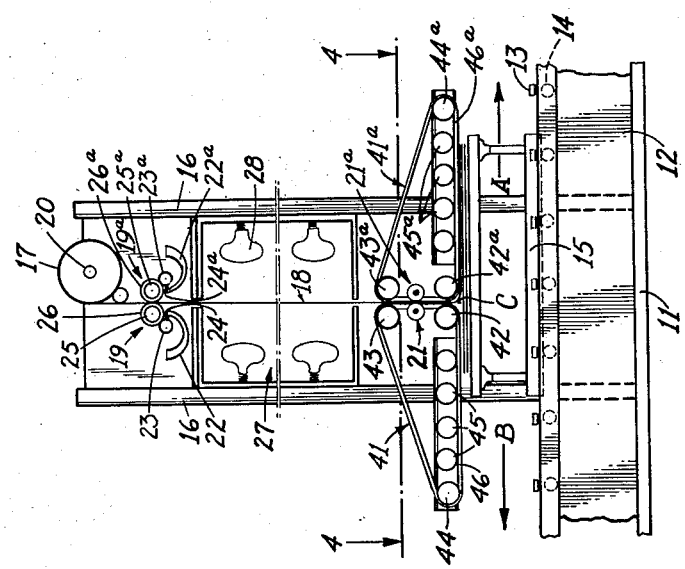

The closest point between rollers 42 and 42ª through which the sheet of material 18 passes is indicated at C in Fig. 2 and for purposes of convenient explanation, said point is hereinafter referred to as the "lapping position."

As has already been indicated, springs 33 normally urge table 31 upwardly toward belt drives 41 and 41ª, and thus after the sheet of material 18 passes lapping position C and is fed continuously on to the top of reciprocating table 31, the said sheet will be compressively engaged between the table top and one or the other of the belt drive units 41 or 41ª depending upon the direction of movement of the table at a given moment. For example, if the carriage and table are moving in the direction of arrow A, the sheet of material as it is fed on to the table will be compressed against belt drive unit 41ª, whereas when the carriage and table are moving in the direction of arrow B, the said material will be compressed upwardly against belt drive unit 41. It is readily understandable that as the table reciprocates back and forth in reciprocal strokes of equal length the sheet of material after passing point C will be correspondingly alternately shifted back and forth away from said lapping position, and in a line of direction or plane lying approximately 90° to the longitudinal axis of the said sheet of material at said lapping position, and in a path parallel to the belt contact surfaces of the belt drive units. To illustrate, if table 31 is moving in the direction of arrow A, the sheet of material is correspondingly moved in the same direction away from the lapping position C and along a line or plane substantially perpendicular to the longitudinal axis of the material as it passes through rollers 42 and 42ª. Similarly, when the table is reciprocated to move in the direction of arrow B, the material moves correspondingly in the same direction and in a line or plane approximately perpendicular to the longitudinal axis of the sheet material at lapping position C. Moreover, because the belt units establish belt pressure contact surfaces at least coextensive in length to the length of reciprocal stroke of the carriage and table, substantially uniform and continuous compression throughout substantially the entire length of the stack can be and is maintained on the stack during lapping operations.

Continuous shifting of the material back and forth with respect to lapping position C, in the above described manner, causes the sheet of glued material to be lapped back and forth over itself in successive laps of equal length to build up a stack 68 of superposed layers of glued material.

The operation of the various parts employed to drive the belts 46 and 46ª has already been explained in some detail, wherein it was pointed out that due to the mesh engagement between pinion 51 and rack 52 rotary movement of rollers 42 and 43 and movement of belts 46 and 46ª was accomplished upon movement of the carriage carrying rack 52. It is noted in this respect that each time the carriage reverses its direction, the direction of movement of the rollers and belts is correspondingly effected, and thus the belts are always moving in the same direction as the sheet material being fed onto the table or stack during lapping operations. It is also important that the belts move at a speed corresponding to the speed of reciprocal movement of the carriage and corresponding to the speed that the paper is being fed onto the table in order that the belts engage portions of the top surface of the said stack, between the glue lines, in non-slipping engagement with said material; i. e., the belts move with the paper and stack and at the same speed therewith to insure that said material is not wrinkled or allowed to crease or wave during lapping operations. The driving speeds of the carriage and table, feed mechanism and belt drives, as well as the glue applicators, are all synchronized by virtue of the fact that movement of any of said parts are dependent upon movement of the main drive shaft 55.

To illustrate, the glue applicators and feed drive rollers are driven by gear connections directly off of shaft 62, whereas the carriage and table are reciprocated by virtue of power transmitted from shaft 61 through reversing gear mechanism 38 and rack and pinion 35—36. Moreover, movement of the belt drive units is made directly dependent upon reciprocation of the carriage through the rack and pinion arrangement 51—52. Thus, when the speed of shaft 61 is varied, either intentionally or by accident, the driving speeds of all the above enumerated parts are immediately and correspondingly affected. An obvious advantage in such an arrangement of parts is that all of the mechanical elements which act upon the sheet material during the process do so in full and complete cooperation with one another, thereby insuring against the possibility of one moving part becoming out of adjustment with relation to the other parts and causing the material to be stretched, wrinkled, torn, or otherwise affected adversely.

The action of compression springs 33 acting upon the bottoms of legs 32 of table 31 are of sufficient strength to spring-bias continuously the stack 68 of material normally upwardly against the belt drives 41 and 41ᵃ to maintain the superposed layers of said stack tightly compressed together during lapping operations. Springs 33 also serve to make table 31 in effect a "floating" table, i. e., as each additional layer of material is added to the stack 68 the table is depressed that much further downwardly to compensate for the additional thickness of each said added layer.

As has been previously indicated heretofore the plurality of belts comprising belt drive unit 41 are alternately spaced with respect to the plurality of belts which comprise belt drive unit 41ᵃ. A valuable feature of the present machine resides in the cooperative relationship which the belt drive units hold with respect to one another whereby they subject stack 68 to uniform and continuous compressional forces substantially throughout the entire length of said stack during lapping operations. As clearly illustrated in Fig. 5, the belts 46 of belt drive unit 41 are arranged and spaced cooperatively with respect to one another (and in relation to the glue applicators 19 and 19ᵃ) whereby the belts 46 operate and bear against top surfaces of stack 68 between upwardly exposed glue lines 10ᵃ (applied to sheet 18 by applicator 19), and directly over concealed glue lines 10ᵇ (applied to sheet 18 by applicator 19ᵃ). Similarly, belts 46ᵃ of belt drive unit 41ᵃ are arranged and spaced cooperatively with respect to one another (and to glue applicators 19 and 19ᵃ) whereby belts 46ᵃ operate on the top surfaces of the stack between exposed glue lines 10ᵇ and directly over concealed glue lines 10ᵃ. Thus, it is seen that at all times during lapping operations substantially continuous and uniform pressure is being applied to the stack throughout its entire length and that said pressure is applied to the top of the stack between exposed glue lines and upon or over concealed glue lines in the stack of glued material.

After a sufficient number of superposed layers of material have been built up or after the material or roll 17 has been exhausted and it is desired to begin operations anew, the entire carriage and table carrying the complete stack 68 may be removed from the machine by permitting pinion 36 to continue to rotate (without actuating the reversing gear mechanism) to drive the carriage completely from without the machine.

To accomplish this end, arm 65, which normally actuates reversing gear mechanism 38 to reciprocate the carriage and table, may be pivoted on hinges, as at 69, (Fig. 4) in such manner as to be capable of being manually lifted upwardly to avoid striking against lugs 66 or 67 during lapping operations. To illustrate, let it be assumed that the carriage and table are being driven in the direction of arrow A and, as has been explained, projecting lugs 66 would normally move against arm 65 to actuate the reversing gear mechanism and cause the carriage and table to reciprocate in the opposite direction. It is readily seen, however, that by merely lifting upwardly arm 65 sufficiently far to avoid contact with lug 66, pinion 36 will continue to rotate in the same direction to drive the carriage completely out of the machine in the direction of arrow A, at which point the sheet of material being fed on the stack may be severed therefrom at a point adjacent the stack. Simultaneously with the removal of the table and carriage carrying completed stack 68, a second carriage and table unit (not shown) may be introduced into the opposite end of the machine, and lapping operations continued as before with the severed end of the sheet material forming the bottom layer of a second stack of material to be built up on the newly introduced table.

After the stack 68 has been removed from the machine sufficient time is allowed for the glue lines to completely harden and to bond the layers of material firmly together. The stack may then be sliced transversely into a number of smaller pieces, and each said piece may then, in turn, be expanded by suitable means to form a honeycomb structure, such as indicated in Fig. 7.

Although I have described my invention in detail by way of example and for purposes of clarity of understanding, it is understood that certain changes and modifications may be made therein without departing from the spirit of the invention or scope of the appended claims.

I claim:

1. A machine for making honeycomb out of an elongated sheet of flexible material comprising, a first glue applicator unit comprising a plurality of spaced individual applicating members to apply spaced substantially parallel glue lines longitudinally of the obverse side of a said sheet of material, a second glue applicator unit comprising a plurality of individual applicating members spaced alternately midway between the applicating members of said first unit to apply spaced parallel glue lines longitudinally of the reverse side of said sheet midway between said first named glue lines, a lapping mechanism comprising a reciprocating member reciprocable in strokes of equal length to lap said glued sheet of material back and forth over itself in successive laps of equal length in a manner whereby each successive lap alternately exposes the obverse side and then the reverse side of said sheet of material to build up a stack of superposed layers of said material, compression means comprising oppositely disposed first and second compression units to maintain the superposed layers formed in said stack firmly compressed together during lapping operations, said first and second compression units comprising a plurality of spaced parallel elongated pressure contact members establishing pressure contact surfaces at least coextensive in length to the length of stroke of said reciprocating member and disposed parallel to the path of movement of said reciprocating member, the pressure contact members of said first compression unit located, spaced and arranged with respect to said first and second applicators to contact and apply substantially continuous and uniform pressure to surfaces of said sheet of material between exposed glue lines applied to the obverse side by said first applicator unit and over concealed glue lines applied to the reverse side thereof by said second applicator unit as said sheet is applied to said stack and becomes exposed during lapping operations, the pressure contact members of said second compression unit located, spaced and arranged with respect to said first and second glue applicators to contact and apply substantially continuous and uniform pressure to said sheet of material between exposed glue lines applied to the reverse side of said sheet by said second applicator and directly over concealed glue lines applied to the obverse side of said sheet by said first applicator as said sheet is applied to said stack and becomes exposed during lapping operations.

2. A machine for making honeycomb according to claim 1 and wherein said first and second compression units comprise first and second belt drive mechanisms, and wherein said pressure contact members of said first and second compression units comprise individual belts incorporated in said first and second belt drive mechanisms respectively.

3. In the manufacture of a honeycomb structure formed from an elongated sheet of flexible material the method of, applying spaced substantially parallel glue lines to the obverse and reverse sides of a said sheet of material longitudinally thereof in a manner whereby the glue lines on the obverse side are spaced alternately with respect to the glue lines on the reverse side of said sheet, lapping said sheet of glued material back and forth over itself in the direction of said glue lines in successive laps of equal length to build up a stack of superposed layers of said glued material, and simultaneously with the said lapping of the glued material continuously applying to top and bottom surfaces of said stack substantially throughout the entire length of said stack compressional forces to maintain the superposed layers of material forming said stack firmly compressed together during lapping operations.

4. In the manufacture of a honeycomb structure formed from an elongated sheet of flexible material the method of, applying spaced substantially parallel glue lines to the obverse and reverse sides of a said sheet of material longitudinally thereof in a manner whereby the glue lines applied to the obverse side are spaced alternately with respect to the glue lines applied to the reverse side of said sheet, lapping said glued sheet of material back and forth over itself in the direction of said glue lines in successive laps of equal length to build up a stack of superposed layers of said glued material, and simultaneously with the lapping of the glued material continuously applying to top and bottom surfaces of said stack substantially throughout the entire length of said stack compressional forces to maintain the superposed layers of material forming said stack firmly compressed together during lapping operations, cutting said stack of glued material transversely to the longitudinal axes of said glue lines to form an expandable slice of said stack, then expanding said slice to form a honeycomb structure.

5. In the art of making a honeycomb structure out of an elongated sheet of flexible material the method of, applying spaced parallel glue lines to the obverse and reverse sides of a said sheet of material longitudinally thereof in a manner whereby the glue lines on the obverse side of said sheet are spaced alternately with respect to the glue lines on the reverse side of said sheet, then lapping said sheet of glued material back and forth over itself in the direction of said glue lines in successive laps of equal lengths to build up a stack of superposed layers of said glued material in a manner whereby the obverse and then the reverse sides of said sheet alternately become exposed on said stack during lapping operations, and simultaneously with the lapping of said sheet continuously applying pressure to the top surfaces of said stack throughout the entire length thereof between exposed glue lines and over concealed glue lines thereof.

6. In a method according to claim 5 the additional steps of, cutting the stack of superposed layers of said glued material in a direction transverse to the longitudinal axes of said glue lines to form a plurality of expandable slices of said stack, and then expanding the slices to form sheets of honeycomb.

7. In a machine for making honeycomb out of an elongated sheet of flexible material the combination comprising first glue applying means to apply spaced substantially parallel glue lines longitudinally along one side of said sheet, second glue applying means to apply spaced substantially parallel glue lines to the opposite side of said sheet between said first named glue lines and substantially parallel thereto, a lapping mechanism comprising a reciprocating member reciprocable in strokes of equal length to lap said material back and forth over itself in successive laps of equal length to build up a stack of superposed layers of said material, and compression members establishing pressure contact surfaces at least coextensive in length to the length of stroke of said reciprocating member and disposed parallel to the path of movement of said reciprocating member to maintain substantially continuous uniform pressure on said stack substantially throughout the entire length of said stack.

8. A machine for making honeycomb according to claim 7 and wherein the said pressure contact surfaces of said compression members are arranged and spaced cooperatively and relatively with respect to said first and second glue applying means to contact surfaces of said stack between exposed lines of glue and directly over concealed lines of glue applied by said first and second glue applying means.

9. A machine for making honeycomb according to claim 7 and wherein said compression members comprise a plurality of spaced parallel belts arranged and constructed to contact top surfaces of said stack throughout the entire length of said stack during lapping operations.

10. In a machine for making honeycomb out of an elongated sheet of flexible material, the combination comprising means to apply spaced substantially parallel glue lines along one side of said sheet, means to apply spaced substantially parallel glue lines to the other side of said sheet between said first named glue lines and substantially parallel thereto, a table, a feed mechanism to feed the glued sheet to said table, means including a driving mechanism to cause relative reciprocal movement in strokes of equal length between said table and said feed mechanism to lap said glued sheet being fed onto said table by said feed mechanism back and forth over itself in successive laps of equal length to build up a stack of layers of said sheet material between said table and said feed mechanism, and compression members located above said table establishing pressure contact surfaces at least coextensive in length to the length of relative reciprocal stroke between said feed mechanism and said table with said pressure contact surfaces disposed parallel to the table surface to maintain substantially continuous and uniform pressure contact with top surfaces of said stack throughout substantially the entire length of said stack during lapping operations.

11. A machine for making honeycomb according to claim 7 wherein said compression members comprise a plurality of spaced parallel belts adapted to contact top surfaces of said stack between upwardly exposed glue lines.

12. A machine for making honeycomb according to claim 13 and wherein said compression members comprise a plurality of spaced parallel belts arranged and spaced cooperatively and relatively with respect to said first and second glue applying means to contact top surfaces of said stack between exposed glue lines and directly over concealed glue lines thereof; and wherein means are provided to drive said belts at a speed and in a direction corresponding to the speed and direction of relative reciprocable movement between said table and said feed mechanism.

13. A machine for making honeycomb according to claim 10 and wherein said means including spring means associated with said table are provided to normally urge compressively said table upwardly toward said compression members.

ROGER C. STEELE.

REFERENCES CITED

The following references are of record in the file of this patent:

UNITED STATES PATENTS

| Number | Name | Date |
|---|---|---|
| 1,263,885 | Guttridge | Apr. 23, 1918 |
| 1,517,945 | Bokum | Dec. 2, 1924 |
| 1,642,178 | Schorsch | Sept. 13, 1927 |
| 1,924,472 | Thomson | Aug. 29, 1933 |
| 2,432,752 | Gray | Dec. 16, 1947 |
| 2,440,209 | Redman | Apr. 20, 1948 |